United States Patent [19]

Gazza et al.

[11] 3,868,267
[45] Feb. 25, 1975

[54] METHOD OF MAKING GRADIENT CERAMIC-METAL MATERIAL

[75] Inventors: George E. Gazza, Sudbury, Mass.; Michael W. Lindley, Holton Heath, England

[73] Assignee: The United States of America as represented by the Secretary of the Army, Washington, D.C.

[22] Filed: Nov. 9, 1972

[21] Appl. No.: 305,047

[52] U.S. Cl. .................. 117/22, 117/61, 117/98, 117/119, 117/123 B, 117/160 R, 117/169 A, 117/169 R, 264/60
[51] Int. Cl. ............................................. C03c 17/06
[58] Field of Search .......... 117/22, 54, 61, 98, 119, 117/121, 123 B, 160, 169 A, 169 R; 29/182.1; 75/202; 51/309; 264/60

[56] References Cited
UNITED STATES PATENTS

| | | | |
|---|---|---|---|
| 1,913,373 | 6/1928 | Golyer | 75/202 X |
| 2,581,252 | 1/1952 | Goetzel et al. | 29/182.1 |
| 2,612,443 | 9/1952 | Goetzel et al. | 29/182.1 X |
| 2,672,426 | 3/1954 | Grubel et al. | 117/121 |
| 3,338,687 | 8/1967 | Dickinson et al. | 29/182.1 |
| 3,457,051 | 7/1969 | Bergna | 75/202 X |
| 3,505,158 | 4/1970 | Murray | 264/60 X |
| 3,649,342 | 3/1972 | Bartlett | 117/169 R X |
| 3,718,441 | 2/1973 | Landingham | 29/182.1 |
| 3,725,015 | 4/1973 | Weaver | 75/202 X |

*Primary Examiner*—William D. Martin
*Assistant Examiner*—Shrive P. Beck
*Attorney, Agent, or Firm*—Frank J. Dynda; Robert P. Gibson; Nathan Edelberg

[57] ABSTRACT

A ceramic-metal material system is fabricated by cold compressing separate adjacent volumes of different ceramic material or different particle sizes to form a porous ceramic compact; infiltrating each separate volume of the compact with a molten metal, the first separate volume of the compact being infiltrated with a metal having a higher melting point than the metal which infiltrates the second separate volume and forms an interface with the first infiltrated metal.

7 Claims, 2 Drawing Figures

Si - rich

Al - rich

Al $B_{12}$ — Si — Al (13X)

Si - rich

Al - rich

Al B_{12} - Si - Al (13X)

Si - rich

Al - rich

B_4 C - Si - Al (13X)

3,868,267

METHOD OF MAKING GRADIENT CERAMIC-METAL MATERIAL

The invention described herein may be manufactured, used, and licensed by or for the Government for governmental purposes without the payment to us of any royalty thereon.

BACKGROUND OF THE INVENTION

This invention relates to the production of lightweight gradient ceramic-metal materials and more particularly to the infiltration of a porous cold pressed ceramic compact by capillary action with a molten metal to produce a material having a combination of different physical properties.

SUMMARY OF THE INVENTION

The present invention involves, e.g., a porous ceramic body prepared by cold pressing a ceramic powder and two infiltrant materials. The porous ceramic body is contacted with the molten infiltrant materials under vacuum. A higher melting material may be utilized initially to infiltrate to a controlled depth through the porous ceramic compact. Then, the lower melting material may be infiltrated into the compact from the other side. The second material would penetrate the compact until it forms an interface with the first infiltrant. If the infiltrant materials form, to some degree, a solid solution with one another, there would be formed a transition zone between the materials. In addition, a porous ceramic body may be prepared composed of more than one ceramic material, and infiltrated with at least one metal. The present invention provides for the fabrication of a ceramic-metal material having a combination of different properties, e.g., a gradient system consisting of a transition from a hard, non-ductile front surface to a tough, ductile rear surface.

It is an object of the present invention to provide and disclose the fabrication of a ceramic-metal material possessing a combination of different physical properties, for lightweight materials applications.

It is a further object of the invention to provide and disclose a system consisting of a transition from a hard, non-ductile front surface to a tough, ductile rear surface.

It is a further object of the present invention to provide and disclose a ceramic-metal material fabricated by the infiltration of a molten metal into a porous ceramic compact composed of more than one powder particle size fraction.

It is a further object of this invention to provide and disclose a ceramic-metal material fabricated by the infiltration of more than one molten metal into a porous ceramic compact composed of more than one powder particle size fraction.

It is a further object of this invention to provide and disclose a ceramic-metal compact fabricated by the infiltration of a molten metal into a porous compact composed of more than one ceramic.

It is a further object of this invention to provide and disclose a ceramic-metal compact fabricated by the infiltration of more than one molten metal into a porous compact composed of more than one ceramic.

Other objects and a fuller understanding of the invention may be ascertained from the following description and claims taken in conjunction with the accompanying drawing in which:

DESCRIPTION OF THE PREFERRED EMBODIMENTS

To illustrate the infiltration of two different ceramic powder size factions, an $AlB_{12}$ powder compact was fabricated by cold pressing powder which had been separated into two powder particle size factions. This was accomplished by positioning $AlB_{12}$ powder of less than 37 micron particle size into a 1 inch I.D. cold press die and lightly tamping. $AlB_{12}$ powder of 37 micron and greater particle size was positioned on top of the $AlB_{12}$ powder of less than 37 microns particle size and lightly tamped. Both powder factions were simultaneously cold pressed together utilizing 17,000 psi. A compact having a thickness of about 0.3 inch was obtained. A graphite crucible having a I.D. of about 1.25 inches and a height of about 3 inches was lined with 0.005 inch grafoil paper. Nine grams of silicon were placed at the bottom of the crucible and tamped to achieve some compaction. The $AlB_{12}$ powder compact, fabricated as previously described, was placed on top of the silicon powder. The crucible was placed into a vacuum furnace and the chamber was evacuated to a pressure of approximately $10^{-5}$ torr. The temperature was raised to 750°C and held for 1½ hours to outgas the system. The temperature was then raised to 1500°C and held for 2 hours. The silicon melted and infiltrated the porous $AlB_{12}$ compact approximately halfway through the thickness of the compact. The specimen was slowly cooled to avoid cracking. The partially infiltrated $AlB_{12}$ compact was removed from the crucible and the crucible was relined with 0.005 inch grafoil paper. Nine grams of aluminum powder were placed at the bottom of the crucible and tamped. The partially infiltrated $AlB_{12}$ compact was placed on the aluminum powder with the uninfiltrated side of the compact in contact with the aluminum powder. The chamber was evacuated to $10^{-5}$ torr and the temperature was raised to 500°C and held for 1½ hours to permit outgassing. The temperature was then raised to 1,100°C and held for 2 hours. The aluminum melted and infiltrated into the compact until it contacted and reacted with the silicon which had been previously infiltrated. The furnace was then slowly cooled.

Figure 1:
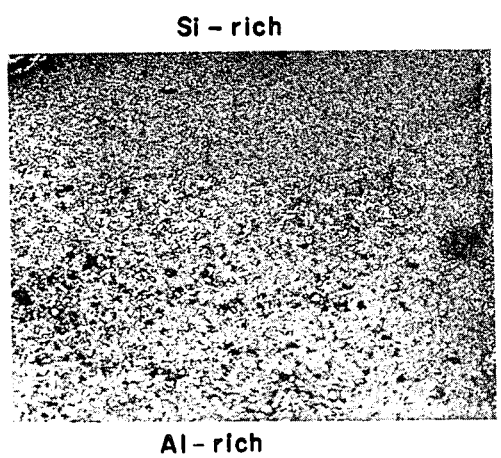
FIG. 1 is a photomicrograph of a cross-sectional area microstructure of $AlB_{12}$ with dual infiltration of silicon and aluminum.
Figure 2:
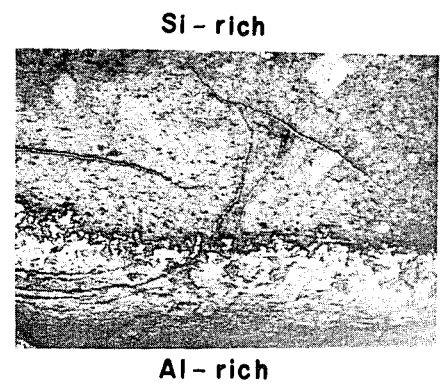
FIG. 2 is a photomicrograph of a cross-sectional area microstructure of $B_4C$ with dual infiltration of silicon and aluminum.

The above process was repeated utilizing $B_4C$ in lieu of $AlB_{12}$. In the $AlB_{12}$ and $B_4C$ infiltrated compacts as shown in FIGS. 1 and 2, respectively, the silicon infiltrated portion of the compacts is hard and non-ductile, whereas the aluminum infiltrated portion is somewhat softer, but exhibits higher strength and some ductility.

In another aspect of the invention, one part of a monolithic ceramic compact to be infiltrated consists of a ceramic material that is "wet" by a liquid metal and hence is infiltrated by this liquid metal. The other part of the same monolithic compact consists of a different ceramic material that is not wet by the same liquid metal infiltrant and hence this part of the compact is not infiltrated. A second differing liquid metal will wet and infiltrate into that part of the same compact not previously infiltrated by the first liquid metal infiltrant. The powder compact therefore, is fabricated from two or more different ceramic powders with selective wetting characteristics with various liquid metal infiltrants.

In an illustrative example, a $B_4C$-$SiB_6$ ceramic powder compact was fabricated. This was accomplished by positioning $B_4C$ powder of less than 43 micron particle size powder in a 1 inch I.D. cold pressing die and lightly tamping. Minus 320 mesh $SiB_6$ powder was placed on top of the $B_4C$ powder and lightly tamped. Both powders was simultaneously cold pressed together. Pressure used was 17,000 psi. Compact thickness was 0.3 inch. A crucible identical to the one utilized in the previous example was lined with 0.005 inch grafoil paper. Nine grams of silcon was placed at the bottom of the crucible and lightly tamped to achieve some compaction. The $B_4C$-$SiB_6$ compact was positioned so that the $B_4C$ component was in contact with the silicon. The crucible was placed into a vacuum furnace and the chamber was evacuated to a pressure of approximately $10^{-5}$ torr. The temperature was raised to 750°C and held for 1½ hours to outgas the system. The temperature was then raised to 1500°C and held for 2 hours. The molten silicon penetrated the $B_4C$ portion of the compact, but it did not penetrate into the $SiB_6$ portion of the compact. The partially infiltrated $B_4C$-$SiB_6$ compact was removed from the crucible and the crucible was relined with 0.005 inch grafoil paper. Nine grams of aluminum powder was placed at the bottom of the crucible and tamped. The partially infiltrated $B_4C$-$SiB_6$ compact was positioned in the crucible so that the $SiB_6$ component contacted the aluminum powder. The crucible was positioned in a vacuum furnace evacuated to $10^{-5}$ torr. The temperature was then raised to 500°C and held for 1½ hours in order to permit outgassing. The temperature was then raised to 1100°C and held for 2 hours. The molten aluminum infiltrated the $SiB_6$ until it contacted and reacted with silicon which had been previously infiltrated.

In addition to the ceramic-materials disclosed above, examples of other systems which can be fabricated utilizing the present method include:

SYSTEMS

| ceramic/metal infiltrant | — | ceramic/metal infiltrant | /wetting agent |
|---|---|---|---|
| $B_4C$/Si | — | $B_4C$/Al | /Si |
| $SiB_6$/Al | — | $SiB_6$/Si | /Al |
| $AlB_{12}$/Si | — | $SiB_6$/Al | /(no wetting agent) |

The ceramic-metal materials fabricated by the present method possess low theoretical density, i.e., in the range of about 2.4 to 2.7 g/cc., which is required for lightweight material applications. In addition, the present invention would be relatively economical for producing gradient ceramic-metal systems due to low temperature-short time parameters required for carrying out the process. Furthermore, the process is readily amenable to the fabrication of gradient system complex shapes.

Although we have described our invention with a certain degree of particularity, we wish it to be understood that we do not desire to be limited to the exact details and components shown and described in that obvious modifications will occur to a person skilled in the art.

Having described our invention, we claim:

1. A method for the fabrication of a ceramic-metal material comprising the steps of:
   a. selecting two separate volumes of a ceramic material said separate volumes having different particle sizes,
   b. placing said separate volumes of a ceramic material adjacent and abutting each other,
   c. cold compressing said separate volumes together to form a porous gradient ceramic compact having an interface at the points of abutment of said separate volumes,
   d. contacting the first of said separate volumes of said ceramic compact with a first metal powder,
   e. heating in a vacuum said first separate volume in contact with a first metal powder above the melting point of said first metal powder so that the molten said first metal powder impregnates the said first separate volume by infiltration,
   f. contacting second said separate volume of said ceramic compact with a second metal powder having a lower melting point than the said first metal powder, and
   g. heating in a vacuum said second metal powder in contact with said second separate volume above the melting point of said second metal powder but below the melting point of said first metal powder so that the molten said second metal powder impregnates the second said separate volume by infiltration.

2. A method in accordance with claim 1 wherein the said ceramic material is selected from the group consisting of $AlB_{12}$ and $B_4C$.

3. A method in accordance with claim 1 wherein one of the said two separate volumes of said ceramic material is composed of particles 37 microns and less in size, and wherein the second said separate volume of said ceramic material is composed of particles greater than 37 microns in size.

4. A method in accordance with claim 1 wherein said first metal powder is silicon and said second metal powder is aluminum.

5. A method for the fabrication of a ceramic-metal material comprising the steps of:
   a. selecting two separate volumes of a ceramic material said separate volumes being different ceramic materials,
   b. placing said separate volumes of a ceramic material adjacent and abutting each other,
   c. cold compressing said separate volumes together to form a porous ceramic compact having an interface at the points of abutment of said separate volumes of different ceramic materials,
   d. contacting the first of said separate volumes of said ceramic compact with a first metal powder,
   e. heating in a vacuum first of said separate volume in contact with a first metal powder above the melting point of said first metal powder so that the molten said first metal powder impregnates the said first separate volume by infiltration,
   f. contacting the second of said separate volume of said ceramic compact with a second metal powder having a lower melting point than the said first metal powder, and
   g. heating in a vacuum said second separate volume of said ceramic compact in contact with said second metal powder above the melting point of said second metal powder but below the melting point of said first metal powder so that the molten said second metal powder impregnates the said second separate volume by infiltration.

6. A method in accordance with claim 5 wherein the said first separate volume contain $B_4C$ of particle size less than 43 microns, and the second separate volume contains $SiB_6$ of particle size less than 43 microns.

7. A method in accordance with claim 5 wherein the said first metal powder is silicon and the second said metal powder is aluminum.

* * * * *

UNITED STATES PATENT AND TRADEMARK OFFICE
CERTIFICATE OF CORRECTION

PATENT NO. : 3,868,267
DATED : Feb. 25, 1975
INVENTOR(S) : George E. Gazza and Michael W. Lindley It is certified that error appears in the above-identified patent and that said Letters Patent are hereby corrected as shown below:

On page one, at [73] Assignee:, change "[73] Assignee: The United States of America as represented by the Secretary of the Army, Washington, D.C."

to "[73] Assignees: The United States of America as represented by the Secretary of the Army, Washington, D.C.; by said Gazza; The Secretary of State for Defence Ministry of Defence, London, England; by said Lindley"

Signed and Sealed this twenty-eight Day of October 1975

[SEAL]

Attest:

RUTH C. MASON
Attesting Officer

C. MARSHALL DANN
Commissioner of Patents and Trademarks